United States Patent
Cho et al.

(10) Patent No.: US 9,768,647 B2
(45) Date of Patent: Sep. 19, 2017

(54) WIRELESS POWER RECEIVER AND METHOD FOR CONTROLLING THE SAME

(71) Applicant: Samsung Electro-Mechanics Co., Ltd., Suwon-si (KR)

(72) Inventors: Sang Ho Cho, Suwon-si (KR); Hyung Wook Cho, Suwon-si (KR); Sung Heum Park, Suwon-si (KR); Chang Mok Han, Suwon-si (KR); Jae Suk Sung, Suwon-si (KR); Jeong Man Han, Suwon-si (KR); Ki Won Chang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 217 days.

(21) Appl. No.: 14/706,482

(22) Filed: May 7, 2015

(65) Prior Publication Data

US 2016/0079764 A1    Mar. 17, 2016

(30) Foreign Application Priority Data

Sep. 11, 2014    (KR) ........................ 10-2014-0120458

(51) Int. Cl.
*H01F 27/42* (2006.01)
*H02J 50/80* (2016.01)

(52) U.S. Cl.
CPC .................................... *H02J 50/80* (2016.02)

(58) Field of Classification Search
CPC ....................................................... H02J 50/80
USPC ........................................................... 307/104
See application file for complete search history.

(56) References Cited

U.S. PATENT DOCUMENTS

| 2015/0035372 A1* | 2/2015 | Aioanei ................. H02J 7/025 307/104 |
| 2015/0244176 A1* | 8/2015 | Van Den Brink ...... H02J 5/005 307/104 |
| 2017/0018954 A1* | 1/2017 | Lee ...................... H04B 5/0081 |

FOREIGN PATENT DOCUMENTS

| KR | 10-2013-0005571 A | 1/2013 |
| KR | 10-2013-0102218 A | 9/2013 |

* cited by examiner

*Primary Examiner* — Jared Fureman
*Assistant Examiner* — Duc M Pham
(74) *Attorney, Agent, or Firm* — NSIP Law

(57) ABSTRACT

A wireless power receiver according to an exemplary embodiment in the present disclosure may include a resonant tank receiving a power signal and varying a resonant frequency in response to a control signal; and a determining unit determining a wireless power transmission mode on the basis of the power signal and outputting the control signal depending on a determination result.

18 Claims, 6 Drawing Sheets

WIRELESS POWER RECEIVER AND METHOD FOR CONTROLLING THE SAME

CROSS-REFERENCE TO RELATED APPLICATION

This application claims priority to, and the benefit of, Korean Patent Application No. 10-2014-0120458 filed on Sep. 11, 2014, with the Korean Intellectual Property Office, the disclosure of which is incorporated herein by reference.

BACKGROUND

This application relates to a wireless power receiver and a method for controlling the same.

Wireless power transfer technology is being applied to the charging of batteries in various communications devices, including smartphones, as well as those of various home appliances. Wireless power transfer technology has a wide range of applications, which may also be applied to the charging of electric vehicles, and the like, in the future.

Recently, various wireless power transmission modes have been developed and used. For example, examples of wireless power transmission modes include a transmission mode according to the wireless power consortium (WPC) standard using a frequency band of about 100 kHz and a transmission mode according to the power matters alliance (PMA) standard using a frequency band of about 200 kHz.

According to the related art, in order to receive power transmitted wirelessly in various wireless power transmission schemes, a slight loss in power transmission efficiency has been tolerated.

RELATED ART DOCUMENT (Patent Document 1) Korean Patent Laid-open Publication No. 2013-0102218

SUMMARY

An exemplary embodiment in the present disclosure may provide a wireless power receiver capable of varying a resonant frequency of a resonant tank according to a wireless power transmission mode.

An exemplary embodiment in the present disclosure may also provide a method for controlling a wireless power receiver capable of varying a resonant frequency of a resonant tank of the wireless power receiver according to a wireless power transmission mode.

According to an exemplary embodiment in the present disclosure, a wireless power receiver may include: a resonant tank receiving a power signal and varying a resonant frequency in response to a control signal; and a determining unit determining a wireless power transmission mode on the basis of the power signal and outputting the control signal depending on a determination result.

According to an exemplary embodiment in the present disclosure, a method for controlling a wireless power receiver including a resonant tank may include: receiving a power signal by using the resonant tank; determining a wireless power transmission mode on the basis of the power signal; and adjusting a resonant frequency of the resonant tank according to the wireless power transmission mode.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Exemplary embodiments in the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

Figure 1:
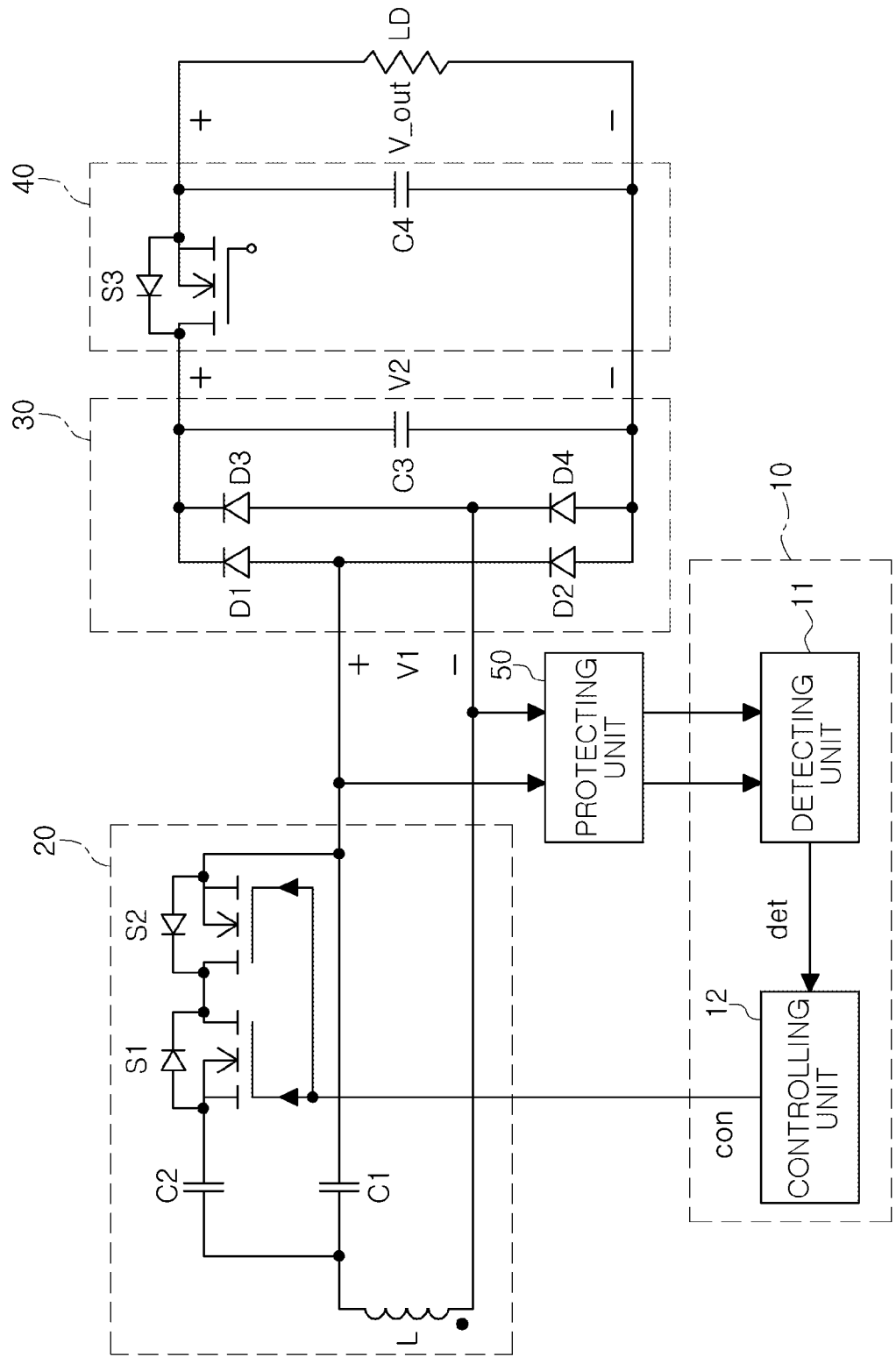
FIG. 1 is a diagram illustrating the configuration of a wireless power receiver according to an exemplary embodiment in the present disclosure.

FIG. 1 is a diagram illustrating the configuration of a wireless power receiver according to an exemplary embodiment in the present disclosure. The wireless power receiver according to the exemplary embodiment may include a determining unit 10, a resonant tank 20, a rectifying unit 30, an outputting unit 40, and a protecting unit 50. The determining unit 10 may include a detecting unit 11 and a controlling unit 12.

The resonant tank 20 may include a power receiving coil L, a first capacitor C1 connected to one end of the power receiving coil L, a second capacitor C2 connected to one end of the power receiving coil L, and switching units S1 and S2 connected between the second capacitor C2 and the first capacitor C1. As illustrated in FIG. 1, the switching units may include a plurality of switches S1 and S2 which are connected to each other in series.

The rectifying unit 30 may include four diodes D1, D2, D3, and D4 configuring a full bridge circuit, and a soothing capacitor C3 connected in parallel to the full bridge circuit.

The outputting unit 40 may include an output switch S3 of which one end is connected to the rectifying unit 30 and the other end is connected to an output terminal, and an output capacitor C4 connected between the other end of the output switch S3 and the rectifying unit 30.

A function of each block illustrated in FIG. 1 will be described below.

The determining unit 10 may determine a wireless power transmission mode on the basis of a power signal received by the resonant tank and may output a control signal con depending on the determination result.

The detecting unit 11 may receive the power signal included in input power V1 received by the resonant tank 20 and may output a detection signal det having different shapes depending on the wireless power transmission mode. The power signal may be a ping signal transmitted from a wireless power transmitter (not shown) and the detecting unit 11 may include a band-pass filter.

The controlling unit 12 may output a control signal con in response to the detection signal det. Specifically, the controlling unit 12 may determine the wireless power transmission mode on the basis of the detection signal det and may output the control signal con according to the determined wireless power transmission mode. For example, the controlling unit 12 may determine the wireless power transmission mode by calculating a time during which the detection signal det maintains a high level and comparing the calculated time with a reference time.

The resonant tank 20 may receive the power transmitted wirelessly from an external power source and may output the input power V1. A resonant frequency of the resonant tank 20 may be varied by the control signal con. That is, the switches S1 and S2 of the switching unit may be turned on or off in response to the control signal con. In addition, if the switches S1 and S2 of the switching unit are turned on, since capacitance of the resonant tank 20 becomes parallel capacitance of the first capacitor C1 and the second capacitor C2, the capacitance of the resonant tank 20 may be relatively increased and the resonant frequency of the resonant tank 20 may be decreased. If the switches S1 and S2 of the switching unit are turned off, since the capacitance of the resonant tank 20 becomes capacitance of the first capacitor C1, the capacitance of the resonant tank 20 may be relatively decreased and the resonant frequency of the resonant tank 20 may be increased.

Although the case in which the resonant frequency of the resonant tank 20 is adjusted by varying the capacitance of the resonant tank 20 has been illustrated in FIG. 1, the resonant frequency of the resonant tank 20 may also be adjusted by varying the inductance of the resonant tank 20 in response to the control signal con. In this case, the resonant tank 20 may also be configured so that inductance of the power receiving coil L is varied in response to the control signal con by using a variable inductor as the power receiving coil L, and may also be configured to include a switch and a coil which are connected to the power receiving coil L in parallel and connected to each other in series, wherein the switch is turned on or off in response to the control signal con.

The rectifying unit 30 may rectify the input power V1 to output rectified power V2.

The outputting unit 40 may receive the rectified power V2 and may output output power V_out having a predetermined magnitude. The output switch S3 of the outputting unit 40 may include a field effect transistor (PET), and the outputting unit 40 may output the output power V_out from which ripple component included in the rectified power V2 is removed, by adjusting a gate voltage of the output switch S3 depending on a voltage across the smooth capacitor C3 of the rectifying unit 30.

The protecting unit 50 may protect the detecting unit 11 by preventing the application of a voltage higher than a reference voltage to the detecting unit 11. The protecting unit 50 may be configured to be similar to a voltage distributor. As described above, the detecting unit 11 may be configured to include a filter, and the wireless power receiver according to an exemplary embodiment in the present disclosure may additionally include the protecting unit 50 in order to prevent a voltage higher than a withstand voltage of the filter from being applied to the detecting unit 11. In some cases, the protecting unit 50 may be omitted.

Figure 2:
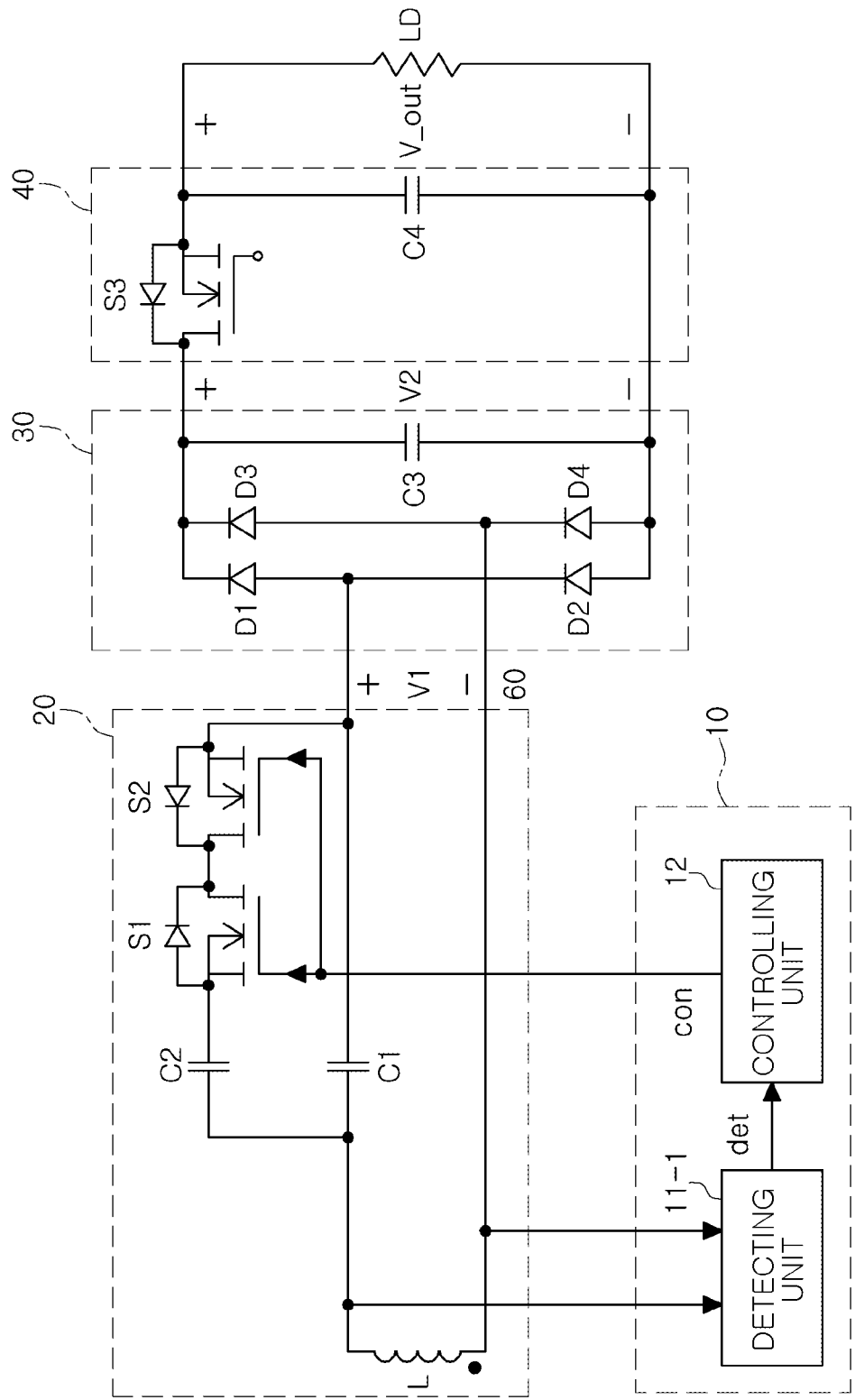
FIG. 2 is a diagram illustrating the configuration of the wireless power receiver according to an exemplary embodiment in the present disclosure.

FIG. 2 is a diagram illustrating the configuration of the wireless power receiver according an exemplary embodiment in the present disclosure. The wireless power receiver according to the exemplary embodiment may include the determining unit 10, the resonant tank 20, the rectifying unit 30, the outputting unit 40, and the determining unit 10 may include a detecting unit 11-1 and the controlling unit 12. The resonant tank 20, the rectifying unit 30, and the outputting unit 40 may have the same configuration as that illustrated in FIG. 1.

A function of each block illustrated in FIG. 2 will be described below.

The controlling unit 12, the resonant tank 20, the rectifying unit 30, and the outputting unit 40 may have the same function as that illustrated in FIG. 1.

The detecting unit 11-1 may receive a power signal included in power received by the resonant tank 20 and may output a detection signal det having different shapes depending on a wireless power transmission mode. As illustrated in FIG. 2, the resonant tank 20 may include the power receiving coil L, and the detecting unit 11-1 may receive signals from both ends of the power receiving coil L and output the detection signal det. In addition, the power signal may be a ping signal and the detecting unit 11-1 may include a band-pass filter.

That is, the detecting unit of the wireless power receiver may sense the power signal at a node of a back end of the capacitor and the switch of the resonant tank 20 as illustrated in FIG. 1 and may sense the power signal at a node of a front end of the capacitor and the switch of the resonant tank 20 as illustrated in FIG. 2.

Although not illustrated, the wireless power receiver according to an exemplary embodiment in the present disclosure illustrated in FIG. 2 may further include a protecting unit for preventing a voltage higher than a reference voltage from being applied to the detecting unit 11-1. In this case, the protecting unit may also be disposed at a front end of the detecting unit 11-1, that is, between the detecting unit 11-1 and the power receiving coil L.

Figure 3A:
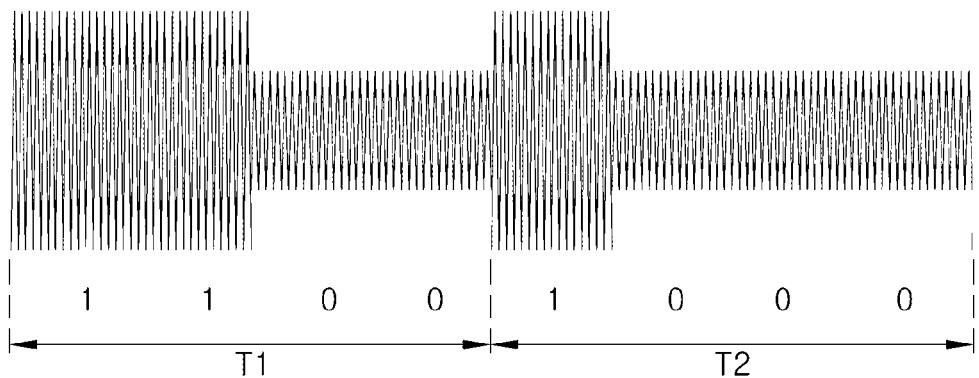
FIGS. 3A and 3B are diagrams illustrating examples of a power signal in different wireless power transmission modes.
Figure 3B:
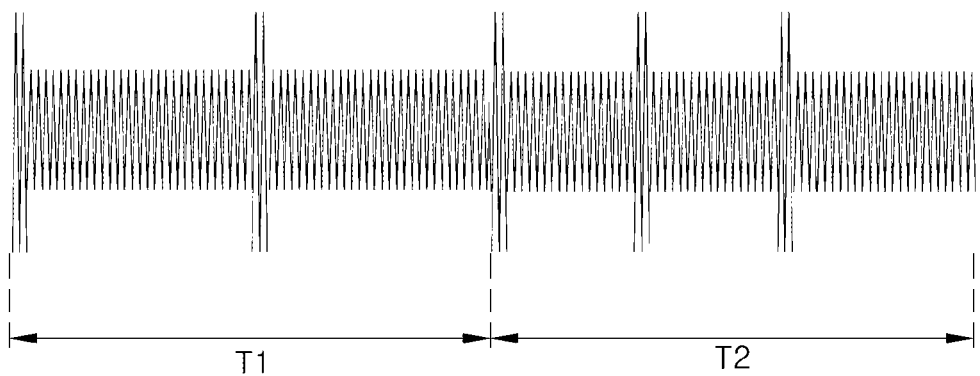

FIG. 3 is a diagram illustrating examples of a power signal in different wireless power transmission modes. FIG. 3A illustrates a ping signal of power transmitted wirelessly in a transmission mode according to the wireless power consortium (WPC) standard, and FIG. 3B illustrates a ping signal of power transmitted wirelessly in a transmission mode according to the power matters alliance (PMA) standard.

As illustrated in FIG. 3A, the ping signal of the power transmitted wirelessly in the transmission mode according to the WPC standard may have the form of a digital signal. That is, if a high level is 1 and a low level is 0, when the voltage of the wirelessly transmitted power is increased, a signal of '1100' as in a section T1 of FIG. 3A may be transmitted, and when the voltage of the wirelessly transmitted power decreased, a signal of '1000' as in a section T2 of FIG. 3B may be transmitted.

On the other hand, as illustrated in FIG. 3B, the ping signal of the power transmitted wirelessly in the transmission mode according to the PHA standard may have a frequency modulation form. That is, when the voltage of the wirelessly transmitted power is increased, a signal of high level may be transmitted at a relatively low frequency (e.g., 100 Hz) as in the section T1 of FIG. 3B, and when the voltage of the wirelessly transmitted power is decreased, the signal of high level may be transmitted at a relatively high frequency (e.g., 200 Hz) as in the section T2 of FIG. 3B.

Figure 4A:
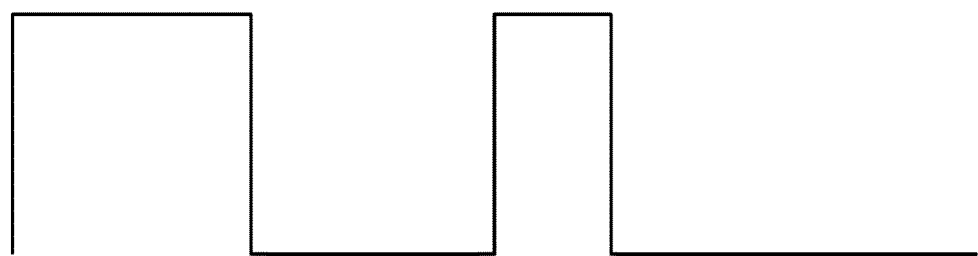
FIGS. 4A and 4B are diagrams illustrating detection signals output from a detecting unit when the power signals of FIG. 3 are applied to the detecting unit of the wireless power receiver according to an exemplary embodiment in the present disclosure.
Figure 4B:
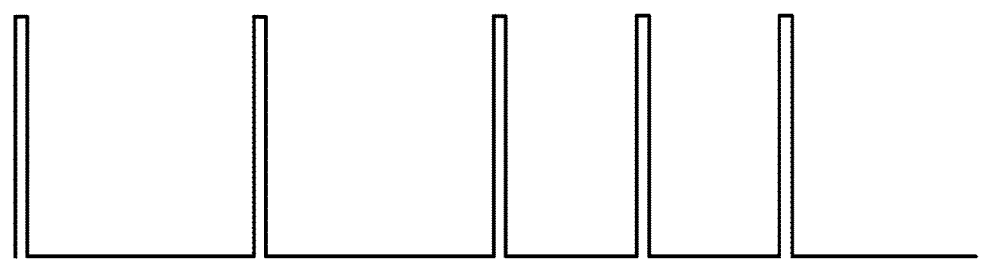

FIGS. 4A and 4B are diagrams illustrating detection signals det (see FIGS. 1 and 2) output from the detecting unit when the power signals of FIG. 3 are applied to the detecting unit of the wireless power receiver according to an exemplary embodiment in the present disclosure.

As described above, the detecting unit of the wireless power receiver according to an exemplary embodiment in the present disclosure may include the band-pass filter. Therefore, when the ping signal of the power transmitted wirelessly in the transmission mode according to the WPC standard illustrated in FIG. 3A is applied to the detecting unit 11 or 11-1 (see FIG. 1 or 2), the detection signal det (see FIGS. 1 and 2) as illustrated in FIG. 4A may be output, and when the ping signal of the power transmitted wirelessly in the transmission mode according to the PMA standard illustrated in FIG. 3B is applied to the detecting unit 11 or 11-1 (see FIG. 1 or 2), the detection signal det (see FIGS. 1 and 2) as illustrated in FIG. 4B may be output.

Figure 5:
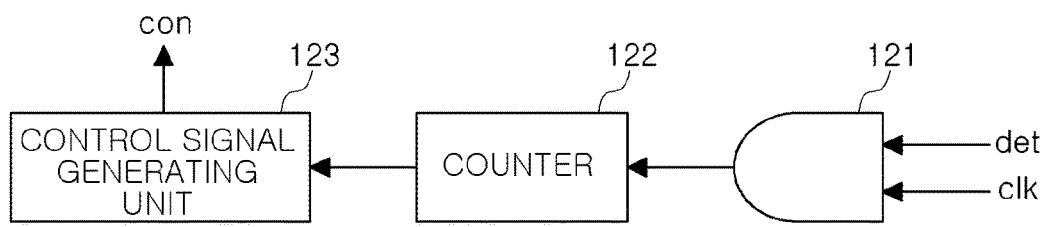
FIG. 5 is a diagram illustrating the configuration of an example of a controlling unit of the wireless power receiver according to an exemplary embodiment in the present disclosure.

FIG. 5 is a diagram illustrating the configuration of an example of a controlling unit of the wireless power receiver according to an exemplary embodiment in the present disclosure. The controlling unit 12 may include a logical AND gate 121, a counter 122, and a control signal generating unit 123.

A function of each block illustrated in FIG. 5 will be described below.

The logical AND gate 121 may receive a detection signal det and a clock signal clk and may output a logical AND signal obtained by performing a logical AND operation. Therefore, when the detection signal det is of high level, the clock signal clk may be output, and when the detection signal det is of low level, a signal of low level may be output. Although not illustrated, the wireless power receiver may further include a clock signal generating unit configured as an oscillator, or the like, in order to generate the clock signal clk. In this case, the clock signal generating unit may also be included in a micro controller unit of the wireless power receiver.

The counter 122 may count the number of pulses included in the logical AND signal output from the logical AND gate 21. As described above, since the clock signal is output as the logical AND signal only in a case in which the detection signal det is of high level, an output value of the counter may be proportional to a time of a section in which the detection signal det is of high level.

The control signal generating unit 123 may determine the wireless power transmission mode by comparing the output value of the counter with a reference value, and may output the control signal con depending on the determination result. For example, in a case in which the output value of the counter is larger than the reference value, the control signal generating unit 123 may determine the wireless power transmission mode as the transmission mode according to the WPC standard and may output the control signal con turning on the switches S1 and S2 (see FIGS. 1 and 2) to allow the resonant frequency of the resonant tank 20 (see FIGS. 1 and 2) to be relatively decreased, and in a case in which the output value of the counter is smaller than the reference value, the control signal generating unit 123 may determine the wireless power transmission mode as the transmission mode according to the PMA standard and may output the control signal con turning off the switches S1 and S2 (see FIGS. 1 and 2) to allow the resonant frequency of the resonant tank 20 (see FIGS. 1 and 2) to be relatively increased.

Although the case in which the controlling unit 12 includes the logical AND gate, the counter, and the control signal generating unit has been illustrated in FIG. 5, the controlling unit 12 may also be configured as a single microprocessor. In this case, the controlling unit 12 may directly measure a time in which the detection signal det is of high level, that is, a pulse width and compare the measured value with a reference value, to determine the wireless power transmission mode and output the control signal con depending on the determination result. In addition, the micro controller unit of the wireless power receiver may be configured to perform the function of the controlling unit 12.

Although the transmission mode according to the WPC standard and the transmission mode according to the PMA standard have been illustrated in FIGS. 3 through 5 by way of example, the present inventive concept may be applied to other modes. That is, in general, power transmission frequencies may differ depending on the wireless power transmission mode, and the power signal (e.g., the ping signal), and the like may also be transmitted in different modes. Therefore, the wireless power receiver according to the exemplary embodiment in the present disclosure may determine the wireless power transmission mode by using characteristics of the power signal.

Figure 6:
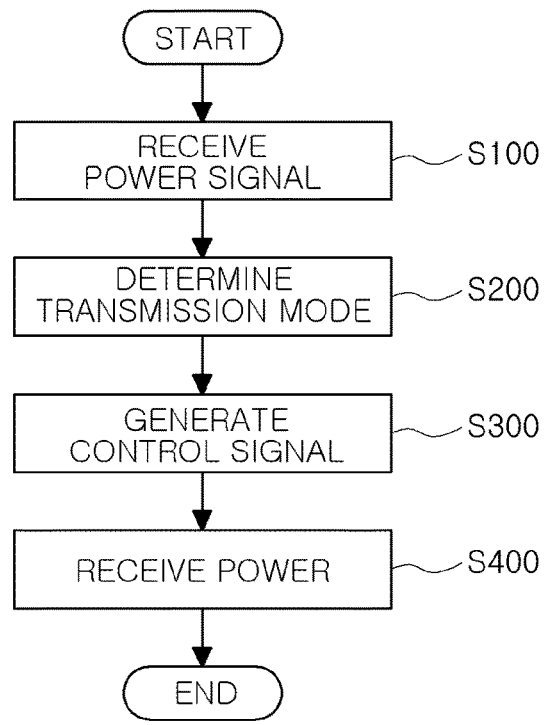
FIG. 6 is a flowchart illustrating a method for controlling a wireless power receiver according to an exemplary embodiment in the present disclosure.

FIG. 6 is a flowchart illustrating a method for controlling a wireless power receiver according to an exemplary embodiment in the present disclosure.

The method for controlling a wireless power receiver according to an exemplary embodiment in the present disclosure will be described with reference to FIG. 6 below.

First, a power signal may be received (S100). For example, the power signal transmitted by the wireless power transmitter may be received through the resonant tank 20 (see FIGS. 1 and 2), and the power signal may be a ping signal transmitted by the wireless power transmitter.

Next, the controlling unit 12 (see FIGS. 1 and 2) may determine a wireless power transmission mode on the basis of the power signal (S200). For example, the controlling unit 12 (see FIGS. 1 and 2) may determine the wireless power transmission mode by comparing a time in which a detection signal generated by filtering the power signal is of high level, that is, a pulse width of the detection signal, with a reference value.

Next, the controlling unit 12 (see FIGS. 1 and 2) may output a control signal according to a result determined in S200 (S300). For example, the controlling unit 12 (see FIGS. 1 and 2) may output the control signal for adjusting the resonant frequency of the resonant tank 20 (see FIGS. 1 and 2) according to the determination result. The control signal may also be a signal for adjusting capacitance of the resonant tank 20 (FIGS. 1 and 2) and may also be a signal for adjusting inductance of the resonant tank 20 (FIGS. 1 and 2).

Next, the wireless power receiver may receive power (S400).

Figure 7:
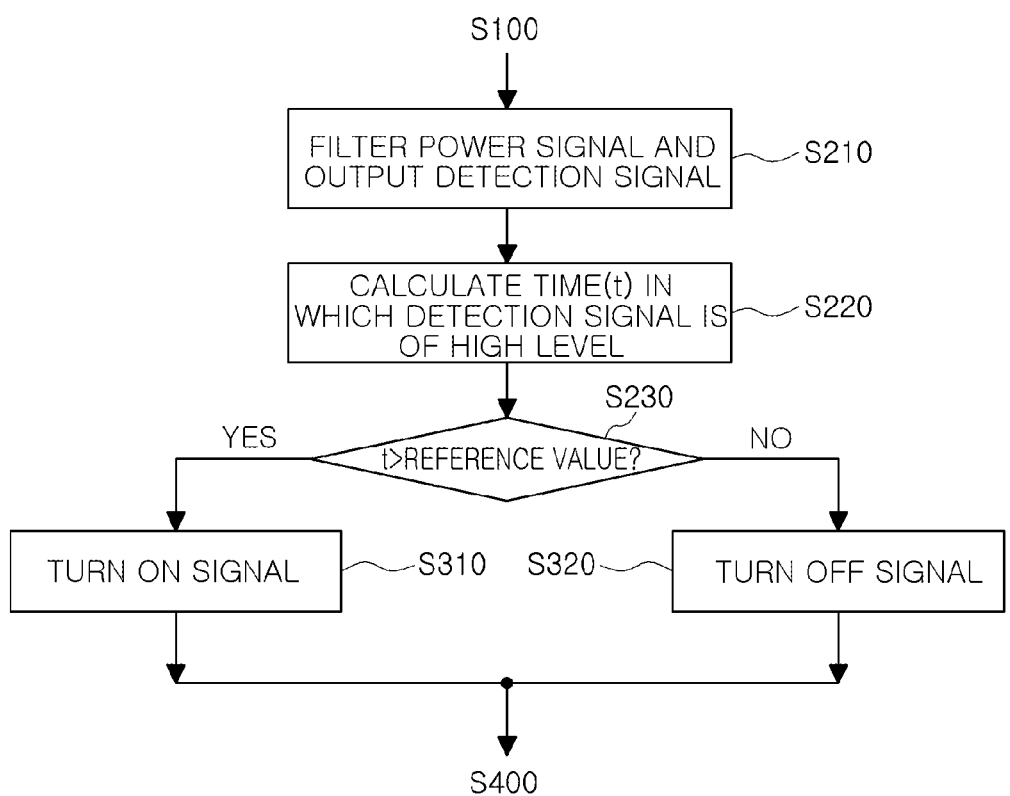
FIG. 7 is a flowchart illustrating examples of determining a transmission mode and generating a control signal in the method for controlling the wireless power receiver illustrated in FIG. 6 according to an exemplary embodiment in the present disclosure.

FIG. 7 is a flowchart illustrating examples of determining the transmission mode and generating the control signal in the method for controlling the wireless power receiver illustrated in FIG. 6 according to an exemplary embodiment in the present disclosure.

The operations of determining the transmission mode and generating the control signal in the method for controlling the wireless power receiver according to an exemplary embodiment in the present disclosure will be described in more detail with reference to FIG. 7 below.

First, a power signal may be filtered and a detection signal may be output (S210).

Next, a time in which the detection signal is of high level, that is, a pulse width of the detection signal may be calculated (S220).

Next, it may be determined whether or not the time calculated in S220, that is, the pulse width is larger than a reference value (S230).

Next, as the determination result in S230, when the pulse width is larger than the reference value, a control signal for turning on the switches S1 and S2 (see FIGS. 1 and 2) may be generated (S310), and when the pulse width is smaller than the reference value, a control signal for turning off the switches S1 and S2 (see FIGS. 1 and 2) may be generated (S320).

As set forth above, according to exemplary embodiments in the present disclosure, in the wireless power receiver and the method for controlling the same, the wireless power transmission mode may be rapidly determined by a simple configuration, and the power transmitted wirelessly in various modes may also be received with optimal power transmission efficiency by varying the resonant frequency of the resonant tank of the wireless power receiver according to the wireless power transmission mode.

In the above exemplary embodiments, the term "~unit" can be implemented in many ways, such as program instructions for execution by a processor, as software modules, microcode, as computer program product on computer readable media, as logic circuits, as application specific integrated circuit, as firmware, etc. Further, embodiments of the invention can take the form of an entirely hardware embodiment, an entirely software embodiment or an embodiment containing both hardware and software elements.

While exemplary embodiments have been shown and described above, it will be apparent to those skilled in the art that modifications and variations could be made without departing from the scope of the present invention as defined by the appended claims.

What is claimed is:

1. A wireless power receiver comprising:
   a resonant tank receiving a power signal and varying a resonant frequency in response to a control signal; and
   a determining unit determining a wireless power transmission mode on the basis of the power signal and outputting the control signal depending on a determination result, wherein the determining unit comprises
   a detecting unit receiving the power signal and outputting a detection signal, and
   a controlling unit calculating a pulse width of the detection signal and outputting the control signal depending on the pulse width.

2. The wireless power receiver of claim 1, wherein the detecting unit is a band-pass filter.

3. The wireless power receiver of claim 1, wherein the controlling unit outputs the control signal so that the resonant tank of the resonant frequency is adjusted to be a first frequency when the pulse width is higher than a reference value, and outputs the control signal so that the resonant frequency of the resonant tank is adjusted to be a second frequency higher than the first frequency when the pulse width is equal to or lower than the reference value.

4. The wireless power receiver of claim 1, wherein the controlling unit includes:
   a logical AND gate performing a logical AND operation on a clock signal and the detection signal;
   a counter counting the number of pulses included in an output signal of the logical AND gate; and
   a control signal generating unit outputting the control signal depending on an output value of the counter.

5. The wireless power receiver of claim 1, wherein the resonant tank includes:
   a power receiving coil;
   a first capacitor connected between one end of the power receiving coil and an output terminal from which input power is output;
   a second capacitor having one end connected to one end of the power receiving coil; and
   a switching unit turned on and off in response to the control signal and connected between the other end of the second capacitor and the output terminal.

6. The wireless power receiver of claim 5, wherein the determining unit receives a signal between the output terminal and the other end of the power receiving coil as the power signal.

7. The wireless power receiver of claim 5, wherein the determining unit receives signals from both ends of the power receiving coil as the power signal.

8. The wireless power receiver of claim 5, wherein the switching unit includes a plurality of switches connected to each other in series.

9. The wireless power receiver of claim 5, further comprising:
   a rectifying unit rectifying the input power to output the rectified power; and
   an outputting unit receiving the rectified power to output power having a predetermined magnitude.

10. The wireless power receiver of claim 1, wherein the power signal is a ping signal output from a wireless power transmitter.

11. The wireless power receiver of claim 1, further comprising a protecting unit limiting a voltage applied to the determining unit to be equal to or lower than a reference voltage.

12. A method for controlling a wireless power receiver including a resonant tank, the method comprising:
   receiving a power signal by using the resonant tank;
   determining a wireless power transmission mode on the basis of the power signal; and
   adjusting a resonant frequency of the resonant tank according to the wireless power transmission mode, wherein the determining of the wireless power transmission mode comprises
   filtering the power signal to the output a detection signal,
   caluculating a pulse width of the detection signal, and
   determining the wireless power transmission mode depending on the pulse width.

13. The method of claim 12, wherein when the pulse width is higher than a reference value, the resonant frequency of the resonant tank is adjusted to be a first frequency, and
   when the pulse width is equal to or lower than the reference value, the resonant frequency of the resonant tank is adjusted to be a second frequency higher than the first frequency.

14. The method of claim 12, wherein the calculating of the pulse width includes:
   performing a logical AND operation on a clock signal and the detection signal to generate a logical AND signal; and
   counting the number of pulses of the logical AND signal.

15. The method of claim 12, wherein the resonant frequency of the resonant tank is adjusted by controlling capacitance of the resonant tank.

16. The method of claim 15, wherein the resonant tank includes a power receiving coil, a first capacitor connected between one end of the power receiving coil and an output terminal from which input power is output, a second capacitor having one end connected to one end of the power receiving coil, and a switching unit connected between the other end of the second capacitor and the output terminal.

17. The method of claim 16, wherein the resonant frequency of the resonant tank is adjusted by turning the switching unit on and off.

18. The method of claim 12, wherein the power signal is a ping signal output from a wireless power transmitter.

* * * * *